(12) United States Patent
Iwaki et al.

(10) Patent No.: US 11,436,080 B2
(45) Date of Patent: Sep. 6, 2022

(54) MEMORY CONTROLLER, MEMORY, MEMORY SYSTEM, INFORMATION PROCESSING SYSTEM, AND METHOD OF CONTROL THEREOF

(71) Applicant: SONY SEMICONDUCTOR SOLUTIONS CORPORATION, Kanagawa (JP)

(72) Inventors: Hiroyuki Iwaki, Kanagawa (JP); Kenichi Nakanishi, Tokyo (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 0 days.

(21) Appl. No.: 16/763,469

(22) PCT Filed: Aug. 6, 2018

(86) PCT No.: PCT/JP2018/029355
§ 371 (c)(1),
(2) Date: May 12, 2020

(87) PCT Pub. No.: WO2019/102656
PCT Pub. Date: May 31, 2019

(65) Prior Publication Data
US 2020/0364109 A1 Nov. 19, 2020

(30) Foreign Application Priority Data
Nov. 21, 2017 (JP) .............................. JP2017-223446

(51) Int. Cl.
*G06F 11/00* (2006.01)
*G06F 11/10* (2006.01)
(Continued)

(52) U.S. Cl.
CPC ...... *G06F 11/1068* (2013.01); *G06F 11/0793* (2013.01); *G06F 11/3037* (2013.01); *G06F 13/1668* (2013.01)

(58) Field of Classification Search
CPC ............. G06F 11/1068; G06F 11/1004; G06F 11/1076; G06F 11/1048; G06F 11/0793; G06F 11/3037
See application file for complete search history.

(56) References Cited

U.S. PATENT DOCUMENTS

| 5,646,948 A | * | 7/1997 | Kobayashi ....... G01R 31/31935 714/719 |
| 2002/0166078 A1 | * | 11/2002 | Oldfield ................ G06F 3/0613 714/6.11 |

(Continued)

FOREIGN PATENT DOCUMENTS

| JP | 2007-241618 A | 9/2007 |
| JP | 2017-054483 A | 3/2017 |
| KR | 10-2017-0032032 A | 3/2017 |

OTHER PUBLICATIONS

International Search Report and Written Opinion of PCT Application No. PCT/JP2018/029355, dated Sep. 34, 2018, 07 pages of ISRWO.

*Primary Examiner* — Charles Ehne
(74) *Attorney, Agent, or Firm* — Chip Law Group

(57) ABSTRACT

A load of a data channel at the time of data writing is reduced. A memory controller includes a specific data pattern retaining unit, a comparator, and an issuance unit. The specific data pattern retaining unit retains a specific data pattern. The comparator compares write data regarding a write command from a host computer with the specific data pattern. The issuance unit issues a specific write request that requests writing of the specific data pattern without supply- (Continued)

ing the write data to a memory in a case where the write data matches the specific data pattern.

11 Claims, 14 Drawing Sheets

(51) Int. Cl.
*G06F 11/07* (2006.01)
*G06F 11/30* (2006.01)
*G06F 13/16* (2006.01)

(56) References Cited

U.S. PATENT DOCUMENTS

| | | | |
|---|---|---|---|
| 2011/0055468 A1* | 3/2011 | Gonzalez | G06F 11/106 711/103 |
| 2011/0289270 A1* | 11/2011 | Bell, Jr. | G06F 16/957 711/112 |
| 2017/0076768 A1 | 3/2017 | Son et al. | |
| 2017/0235523 A1* | 8/2017 | Nakano | G06F 3/0659 714/800 |

* cited by examiner

| PATTERN IDENTIFIER | SPECIFIC DATA PATTERN |
|---|---|
| PT1 | 0x0000000000000000 |
| PT2 | 0xFFFFFFFFFFFFFFFF |
| PT3 | 0x5555555555555555 |
| PT4 | 0xAAAAAAAAAAAAAAAA |
| PT5 | 0xFFFFFFFF00000000 |
| ⋮ | ⋮ |

MEMORY CONTROLLER, MEMORY, MEMORY SYSTEM, INFORMATION PROCESSING SYSTEM, AND METHOD OF CONTROL THEREOF

CROSS REFERENCE TO RELATED APPLICATIONS

This application is a U.S. National Phase of International Patent Application No. PCT/JP2018/029355 filed on Aug. 6, 2018, which claims priority benefit of Japanese Patent Application No. JP 2017-223446 filed in the Japan Patent Office on Nov. 21, 2017. Each of the above-referenced applications is hereby incorporated herein by reference in its entirety.

TECHNICAL FIELD

The present technology relates to a memory system. More specifically, the present technology relates to a memory, a memory controller that controls the memory, a memory system, an information processing system, a processing method thereof, and a program that causes a computer to execute the method.

BACKGROUND ART

In memory systems, a command issued from a host computer is temporarily received by a memory controller, and a request such as read or write is issued from the memory controller to a memory via a channel. Therefore, data transfer between the host computer and the memory can be flexibly controlled. For example, a memory controller that controls commands by assigning priorities thereto is proposed (for example, see Patent Document

CITATION LIST

Patent Document

Patent Document 1: Japanese Patent Application Laid-Open No. 2017-054483

SUMMARY OF THE INVENTION

Problems to be Solved by the Invention

In the above-described related art, a request such as read or write is issued from a memory controller to a memory via a channel. In such a configuration, a request channel and a data channel are physically separated, and the performance of the data channel is more likely to be regulated as the memory speed increases. That is, there is a possibility that other requests cannot be issued and that the memory throughput cannot be fully utilized when the data channel enters a busy state.

The present technology has been devised in view of such a situation, and an object of the present technology is to reduce the load on a data channel at the time of data writing.

Solutions to Problems

The present technology has been made in order to solve the above-described disadvantage, and a first aspect of the present technology is a memory controller and a method of control thereof, the memory controller including: a specific data pattern retaining unit that retains a specific data pattern; a comparator that compares write data regarding a write command from a host computer and the specific data pattern; and an issuance unit that issues a specific write request that requests writing of the specific data pattern without supplying the write data to a memory in a case where the write data matches the specific data pattern. This brings about the effect that the specific write request is issued without supplying the write data in a case where the write data matches the specific data pattern.

Moreover, in the first aspect, the specific data pattern retaining unit may retain a plurality of the specific data patterns in association with identifiers, and the issuance unit may issue one of the identifiers that is associated with the specific data pattern that matches the write data to the memory together with the specific write request. This brings about the effect of identifying the plurality of specific data patterns using the identifiers.

Furthermore, in the first aspect, an error correction code generating unit that generates an error correction code regarding the write data and an error correction processing unit that performs an error correction process on the basis of an error correction code regarding reading from the memory may be further included, and the specific data pattern may include the error correction code regarding the write data. This brings about the effect of improving the reliability of the memory.

Furthermore, in the first aspect, a management information retaining unit that retains predetermined management information, an error correction code generating unit that generates an error correction code regarding the write data and the management information, and an error correction processing unit that performs an error correction process on the basis of an error correction code regarding reading from the memory may be further included, and the issuance unit may issue an error correction code regarding the write data and the management information to the memory together with the specific write request. This brings about the effect that the management information is further stored in the memory. In this case, a logical address or defective cell information in the memory regarding the write command may be assumed for the management information.

In addition, a second aspect of the present technology is a memory and a method of control thereof, the memory including: a memory array; a specific data pattern retaining unit that retains a specific data pattern; a request interpretation unit that interprets a request issued by the memory controller; and a specific data pattern generating unit that writes the specific data pattern retained in the specific data pattern retaining unit to the memory array when it is interpreted that a specific write request has been issued. This brings about the effect that the specific data pattern is generated and written to the memory array when a specific write request is issued.

Furthermore, a third aspect of the present technology is a memory system and an information processing system each including: a memory controller that issues a specific write request that requests writing of a specific data pattern without supplying write data in a case where the write data regarding a write command from the host computer matches the specific data pattern; and a memory that generates the specific data pattern corresponding to the specific write request and writes the specific data pattern to a memory array when the specific write request is issued from the memory controller. This brings about the effect that the specific data pattern is generated in the memory and written to the memory array without supplying the write data from the memory controller in a case where the write data matches the specific data pattern.

Effects of The Invention

The present technology can achieve the outstanding effect that the load of a data channel at the time of data writing can be reduced. Note that effects described herein are not necessarily limiting. Any one of the effects described in the present disclosure may be achieved.

BRIEF DESCRIPTION OF DRAWINGS

FIG. 4 is a table illustrating a configuration example of specific data pattern retaining units 241 and 331 according to the embodiment of the present technology.

MODE FOR CARRYING OUT THE INVENTION

Embodiments for carrying out the present technology (hereinafter referred to as the "embodiments") will be described below. Description will be given in the following order.

1. First Embodiment (example of generating write data in a memory)
2. Second Embodiment (example of further writing management information)

1. First Embodiment

Configuration

Figure 1:
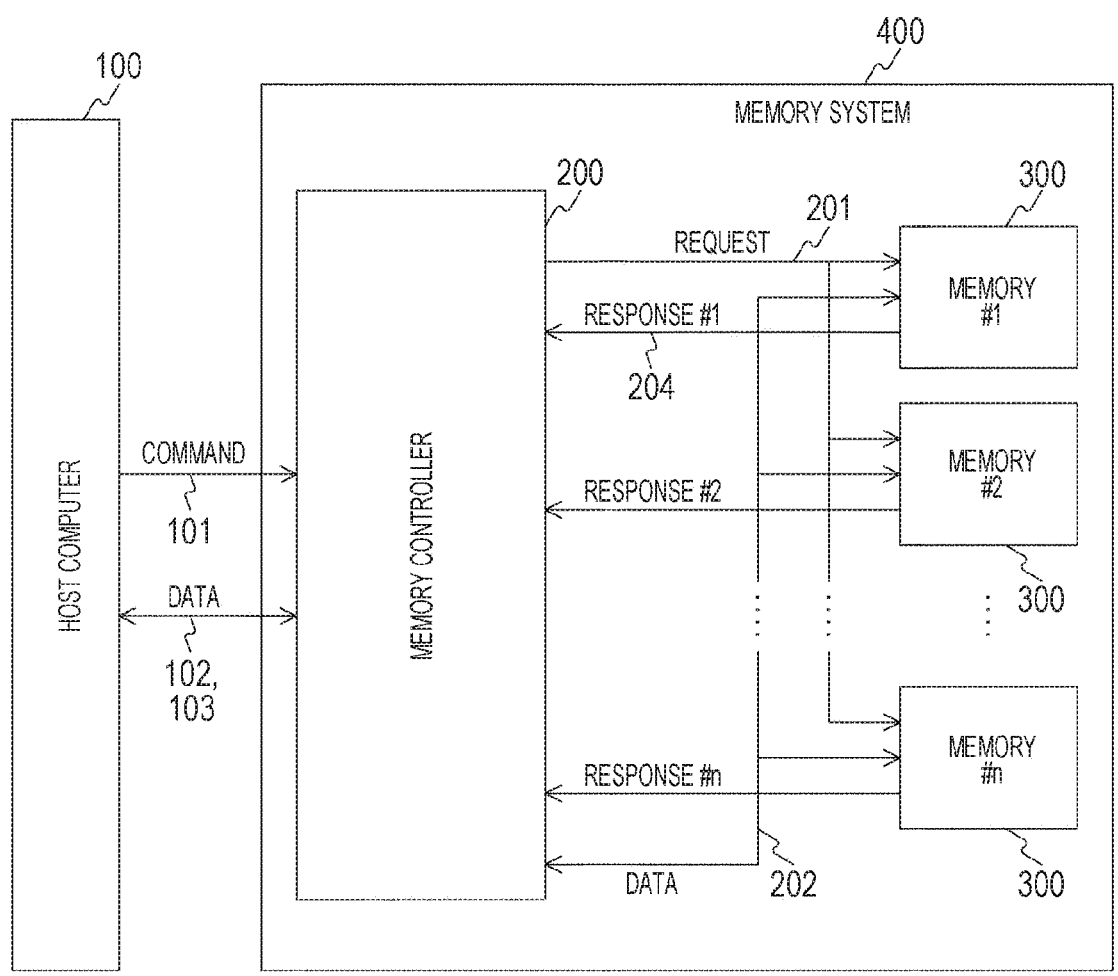
FIG. 1 is a diagram illustrating an exemplary configuration of an information processing system according to an embodiment of the present technology.

FIG. 1 is a diagram illustrating an exemplary configuration of an information processing system according to the embodiment of the present technology. This information processing system includes a host computer 100, a memory controller 200, and multiple memories 300. Moreover, the memory controller 200 and the multiple memories 300 are included in a memory system 400.

The host computer 100 is a processing device that performs processing in the information processing system. The host computer 100 issues a command to the memory system 400 via a command interface 101. The host computer 100 also exchanges data with the memory system 400 via data interfaces 102 and 103.

The memory controller 200 is a device that controls access to the multiple memories 300. The memory controller 200 connects with the host computer 100 via the command interface 101 and the data interfaces 102 and 103. The memory controller 200 also issues a request such as read or write to the multiple memories 300 via a request channel 201. The memory controller 200 also exchanges data with the multiple memories 300 via a data channel 202.

Each of the multiple memories 300 is a device that has a memory array and stores data. These multiple memories 300 is not required to be divided as memory dies, but are assumed to include multiple areas that are independently accessible. After a write request is received from the memory controller 200, a response to the write request is returned to the memory controller 200 via a response channel 204.

Figure 2:
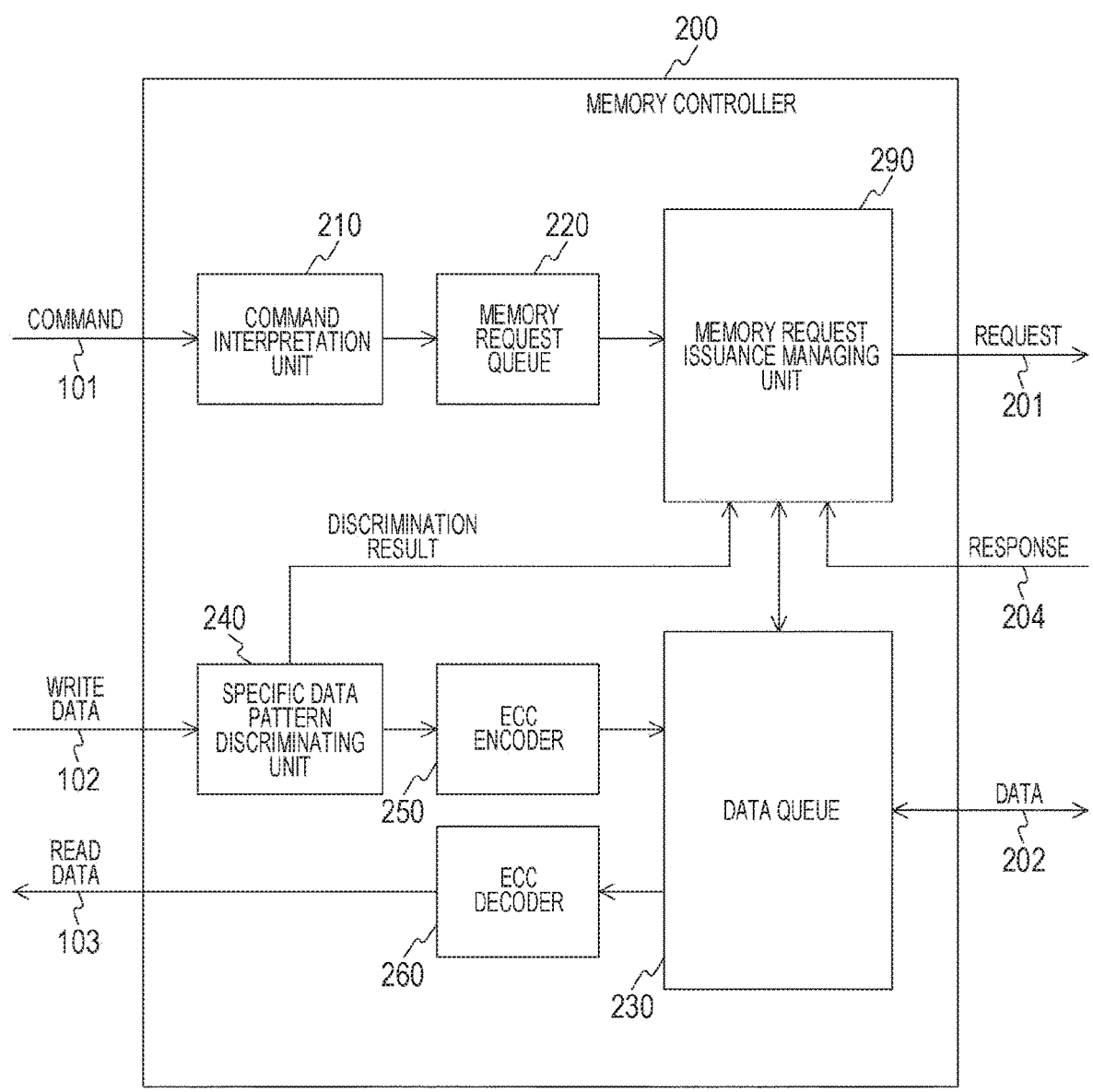
FIG. 2 is a diagram illustrating an exemplary configuration of a memory controller 200 according to a first embodiment of the present technology.

FIG. 2 is a diagram illustrating an exemplary configuration of the memory controller 200 according to the first embodiment of the present technology.

The memory controller 200 according to the first embodiment includes a command interpretation unit 210, a memory request queue 220, a data queue 230, a specific data pattern discriminating unit 240, and a memory request issuance managing unit 290. The memory controller 200 further includes an ECC encoder 250 and an ECC decoder 260 for handling error correction codes (ECCs).

The command interpretation unit 210 interprets a command issued from the host computer 100 via the command interface 101, and generates a memory request. The memory request generated by the command interpretation unit 210 is input to the memory request queue 220.

The memory request queue 220 is a first-in first-out (FIFO) queue that retains the memory request generated by the command interpretation unit 210. The memory request retained in the memory request queue 220 is supplied to the memory request issuance managing unit 290.

The data queue 230 is a first-in first-out queue that retains each of write data supplied from the host computer 100 via the data interface 102 and read data supplied from a memory 300 via the data channel 202. The write data retained in the data queue 230 is supplied to a memory 300 via the data channel 202. The read data retained in the data queue 230 is supplied to the host computer 100 via the data interface 103 after being subjected to ECC decoding.

The specific data pattern discriminating unit 240 discriminates whether or not the write data supplied from the host computer 100 via the data interface 102 corresponds to a specific data pattern. The specific data pattern discriminating unit 240 retains the specific data pattern as described later, and detects a match through comparison with write data. In a case where the write data matches the specific data pattern, the discrimination result is transferred to the memory request issuance managing unit 290, and the write data is discarded. On the other hand, in a case where the write data does not correspond to the specific data pattern, the write data is supplied to the ECC encoder 250.

The memory request issuance managing unit 290 manages issuance of a memory request to a memory 300. The memory request issuance managing unit 290 issues a specific write request for requesting writing of the specific data pattern to a memory 300 via the request channel 201 in a case where write data matches the specific data pattern in the specific data pattern discriminating unit 240. At this point, the write data is discarded, and the data channel 202 is not used. On the other hand, in a case where the write data does not correspond to the specific data pattern, the memory request issuance managing unit 290 issues a normal write request to the memory 300 via the request channel 201. At this point, the corresponding write data is transferred to the memory 300 via the data channel 202. Note that the memory request issuance managing unit 290 is an example of an issuance unit described in the claims.

Note that it is not necessary to issue commands to a memory 300 in the order of access requests from the host computer 100. Therefore, in a case where the access order of write and read to the same memory cell area is switched, there is a possibility that the consistency of data to be stored may not be maintained. Therefore, the memory controller 200 needs to manage so that the consistency of stored data is maintained when a write request, including access to the same memory cell area as that of a previously received read request, is received. That is, the memory controller 200 manages so as to issue a write request to the memory cell area at least after confirming completion of reading from the memory cell area. Therefore, the consistency of stored data can be maintained.

In a case where write data is supplied from the specific data pattern discriminating unit 240, the ECC encoder 250 generates an ECC of the write data and supplies the ECC to the data queue 230. Note that the ECC encoder 250 is an example of an error correction code generating unit described in the claims.

In a case where read data is supplied from the data queue 230, the ECC decoder 260 performs error detection and error correction on the read data. Therefore, the error can be detected and corrected when an error occurs in the memory 300. Note that the ECC decoder 260 is an example of an error correction processing unit described in the claims.

Figure 3:
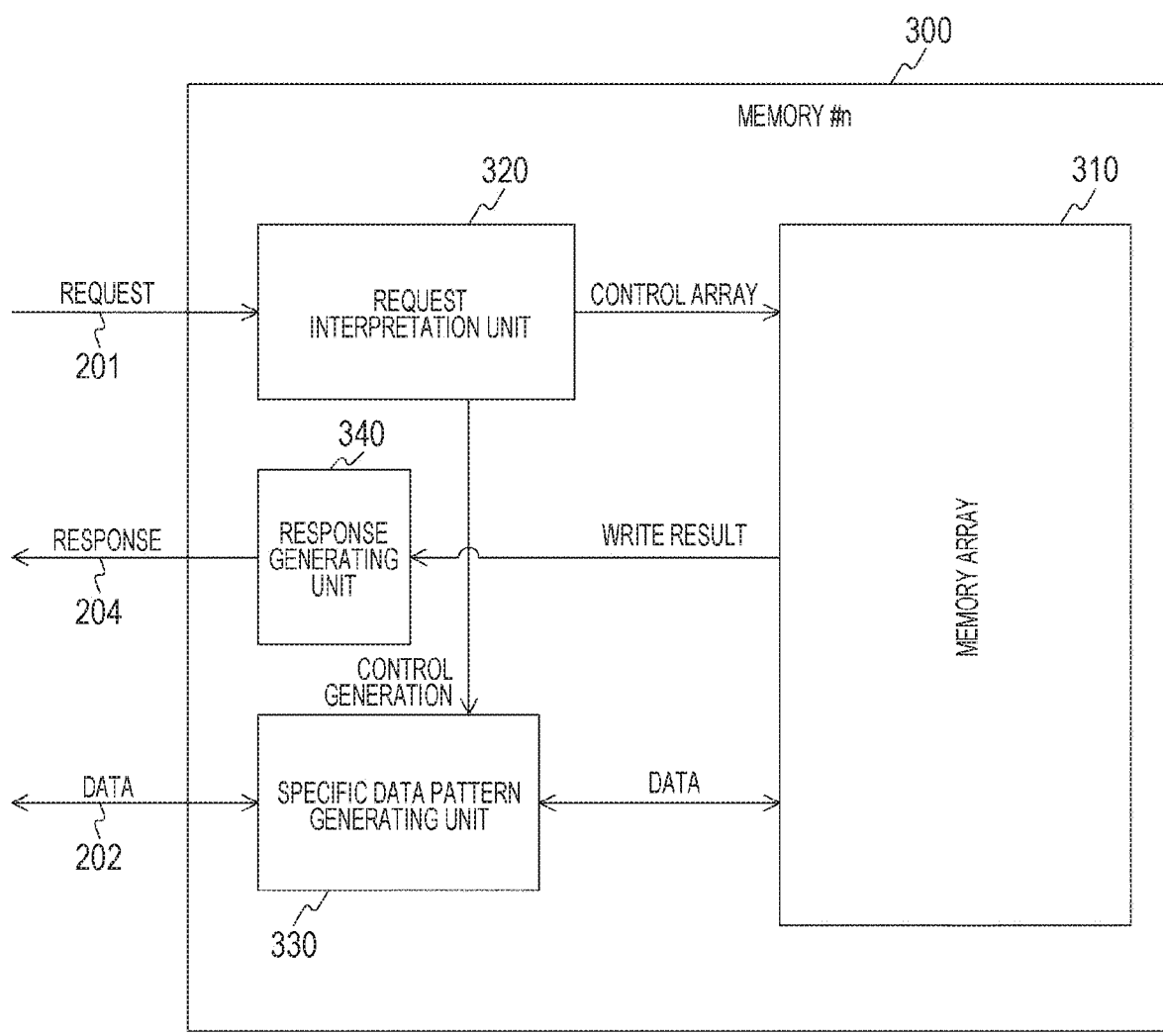
FIG. 3 is a diagram illustrating a configuration example of a memory 300 according to the first embodiment of the present technology.

FIG. 3 is a diagram illustrating a configuration example of a memory 300 according to the first embodiment of the present technology.

A memory 300 according to the first embodiment includes a memory array 310, a request interpretation unit 320, a specific data pattern generating unit 330, and a response generating unit 340.

The memory array 310 includes an array of memory cells for storing data. As a device structure of a memory cell, for example, a nonvolatile memory is assumed; however, a volatile memory may be used.

The request interpretation unit 320 interprets a memory request issued from the memory controller 200. According to the interpretation result, the request interpretation unit 320 performs array control on the memory array 310 or generation control on the specific data pattern generating unit 330.

The specific data pattern generating unit 330 generates a specific data pattern in accordance with the generation control from the request interpretation unit 320. When the request interpretation unit 320 detects issuance of a specific write request, the specific data pattern generating unit 330 generates a specific data pattern corresponding to the specific write request and supplies the specific data pattern to the memory array 310. In addition, the specific data pattern generating unit 330 performs exchange of normal write data or read data between the memory array 310 and the data channel 202.

The response generating unit 340 generates a response depending on a write result in the memory array 310. This response is supplied to the memory request issuance managing unit 290 via the response channel 204.

FIG. 4 is a table illustrating a configuration example of the specific data pattern retaining units 241 and 331 according to the embodiment of the present technology. Note that "0x" indicates that a following number is a hexadecimal number.

The specific data pattern discriminating unit 240 of the memory controller 200 includes a specific data pattern retaining unit 241. Note that the specific data pattern retaining unit 241 is an example of a specific data pattern retaining unit described in the claims. In addition, a specific data pattern generating unit 330 of a memory 300 includes a specific data pattern retaining unit 331. Therefore, the write processing can be performed without using the data channel 202 for specific data patterns.

The specific data pattern retaining units 241 and 331 are assumed to retain a plurality of specific data patterns, and retain a pattern identifier in association with each of the specific data patterns. In this example, a pattern identifier "PT1" is associated with the specific data pattern of all zeros. Another pattern identifier "PT2" is associated with the specific data pattern of all ones (continuous 0xFF). Still another pattern identifier "PT3" is associated with the specific data pattern of repeated 0x55 (binary number "01010101"). Yet another pattern identifier "PT4" is associated with the specific data pattern of repeated 0xAA (binary number "10101010"). Still yet another pattern identifier "PT5" is associated with the specific data pattern in which first four bytes are all ones (continuous 0xFF), and subsequent bytes are all zeros.

These specific data patterns may be specified in advance at the time of configuring the system, or may be set later by a user. In either case, it is desirable that a data pattern written from the host computer 100 to the memory system 400 be set as a specific data pattern. In a case where it is known in advance that a data pattern satisfying a specific condition is to be written in a program operating on the host computer 100, it is preferable to set the data pattern as a specific data pattern.

Note that it is assumed in this example that a plurality of specific data patterns is retained; however, only one specific data pattern may be retained. Since the specific data pattern is uniquely specified in this case, it is not necessary to retain a pattern identifier.

Figure 5:
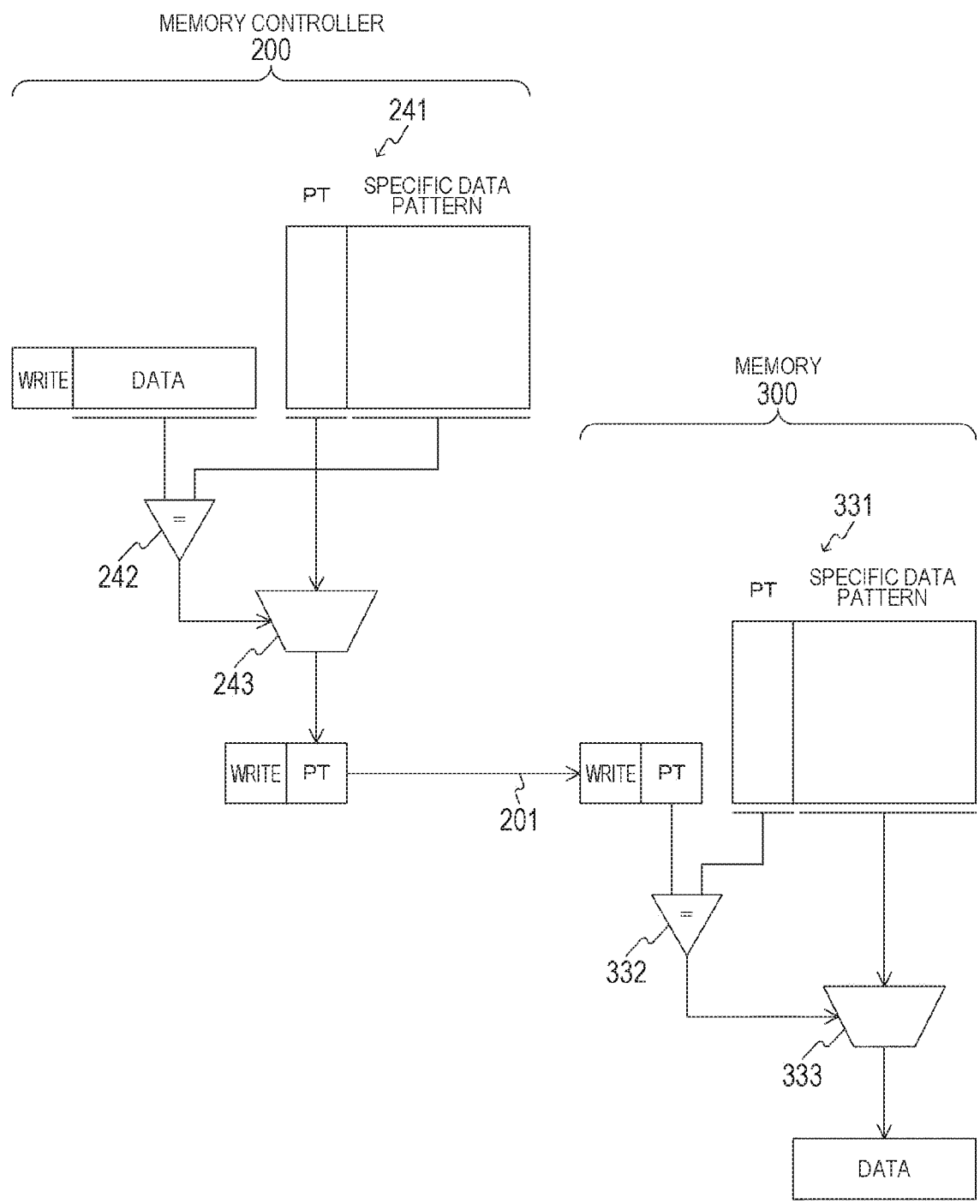
FIG. 5 is a diagram illustrating an example of a transfer mode of a write request according to the embodiment of the present technology.

FIG. 5 is a diagram illustrating an example of a transfer mode of a write request according to the embodiment of the present technology.

The specific data pattern discriminating unit 240 of the memory controller 200 includes a comparator 242 and a selector 243. The comparator 242 compares write data from the host computer 100 with the specific data patterns retained in the specific data pattern retaining unit 241. When the write data matches a specific data pattern, the selector 243 selects the pattern identifier associated with the specific data pattern from the specific data pattern retaining unit 241.

The pattern identifier thus obtained is supplied to a memory 300 via the request channel 201 together with the write request.

A specific data pattern generating unit 330 of a memory 300 includes a comparator 332 and a selector 333. The comparator 332 compares the pattern identifier supplied via the request channel 201 with the specific data patterns retained in the specific data pattern retaining unit 331. In a case where the pattern identifier matches a specific data pattern retained in the specific data pattern retaining unit 331, the selector 333 selects the specific data pattern associated with the pattern identifier from the specific data pattern retaining unit 331.

In this manner, a specific data pattern is obtained on the basis of the pattern identifier, and is used as write data in the memory 300.

Figure 6:
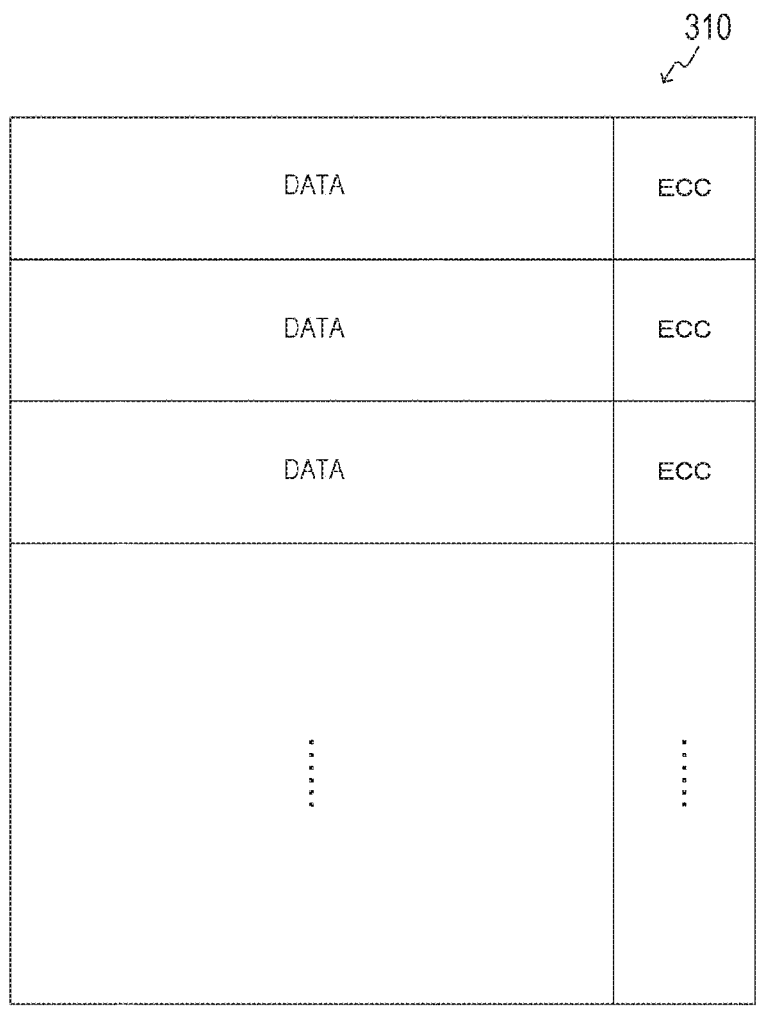
FIG. 6 is a diagram illustrating an example of storage contents of a memory array 310 according to the first embodiment of the present technology.

FIG. 6 is a diagram illustrating an example of storage contents of the memory array 310 according to the first embodiment of the present technology.

The memory array 310 according to the first embodiment stores data and ECC in association with each other. The ECC has been generated by the ECC encoder 250 and written by a write request. The data and the ECC are read in response to a read request, and are subjected to error detection and error correction by the ECC decoder 260. Therefore, the reliability of the memory 300 is ensured.

[Operation]

Figure 7:
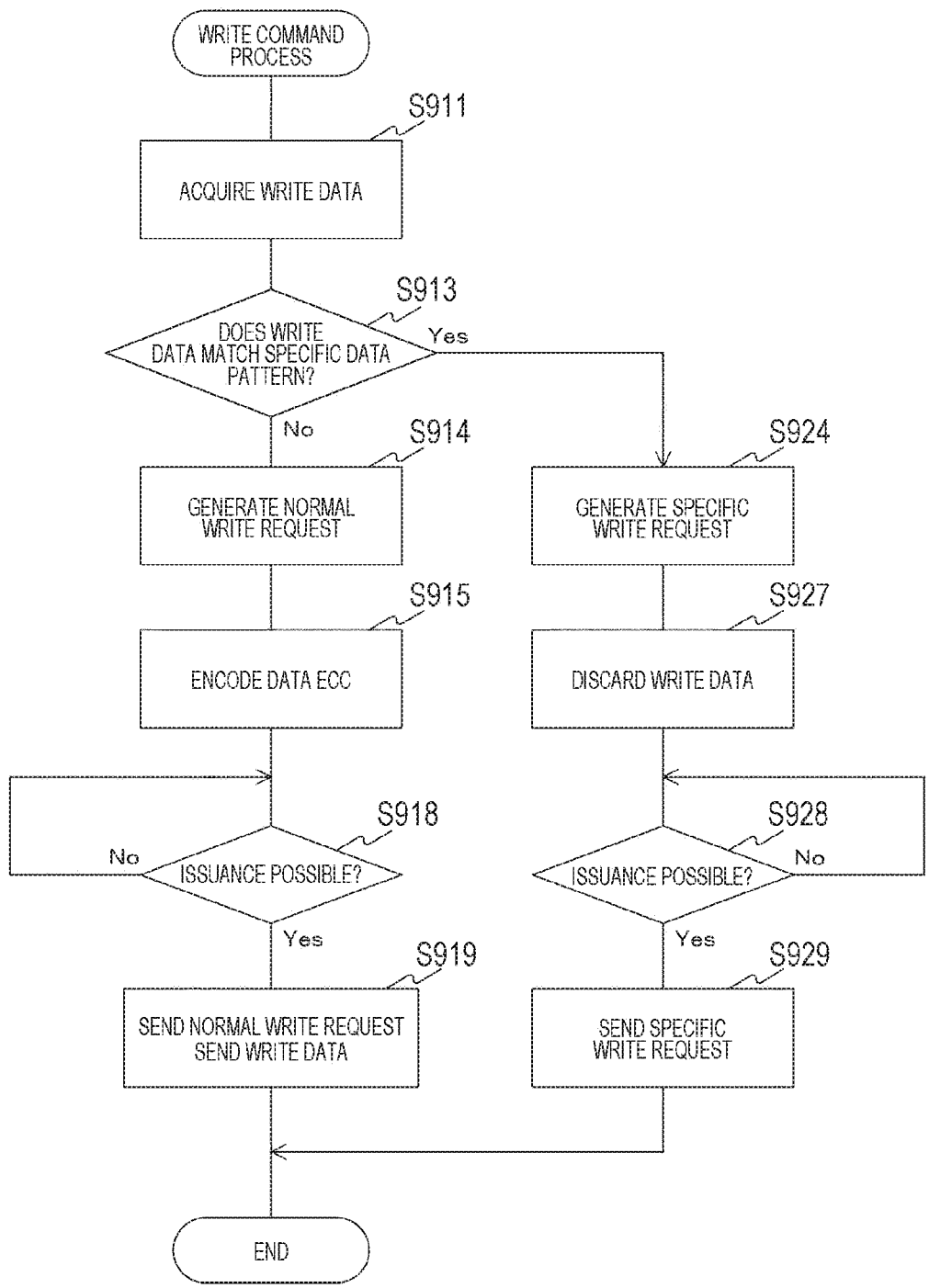
FIG. 7 is a flowchart illustrating an exemplary processing procedure of a memory controller 200 according to the first embodiment of the present technology.

FIG. 7 is a flowchart illustrating an exemplary processing procedure of the memory controller 200 according to the first embodiment of the present technology.

First, the memory controller 200 acquires write data via the data interface 102 when a write command is issued from the host computer 100 (step S911). Then, the specific data pattern discriminating unit 240 discriminates whether or not the write data matches a specific data pattern retained in the specific data pattern retaining unit 241 (step S913).

If the write data does not match any specific data pattern (step S913: No), the memory request issuance managing unit 290 generates a normal write request (step S914). Furthermore, the ECC encoder 250 generates an ECC for the write data (step S915). Then, if it becomes possible to issue the request (step S918: Yes), a normal write request is issued to a memory 300 via the request channel 201 (step S919). At this point, the corresponding write data is supplied to the memory 300 via the data channel 202 (step S919).

On the other hand, if the write data matches a specific data pattern (step S913: Yes), the memory request issuance managing unit 290 generates a specific write request (step S924). In this case, the specific data pattern discriminating unit 240 discards the write data (step S927). Then, if it becomes possible to issue the request (step S928: Yes), the specific write request is issued to the memory 300 via the request channel 201 (step S929). At this point, the write data is discarded, and the data channel 202 is not used.

Figure 8:
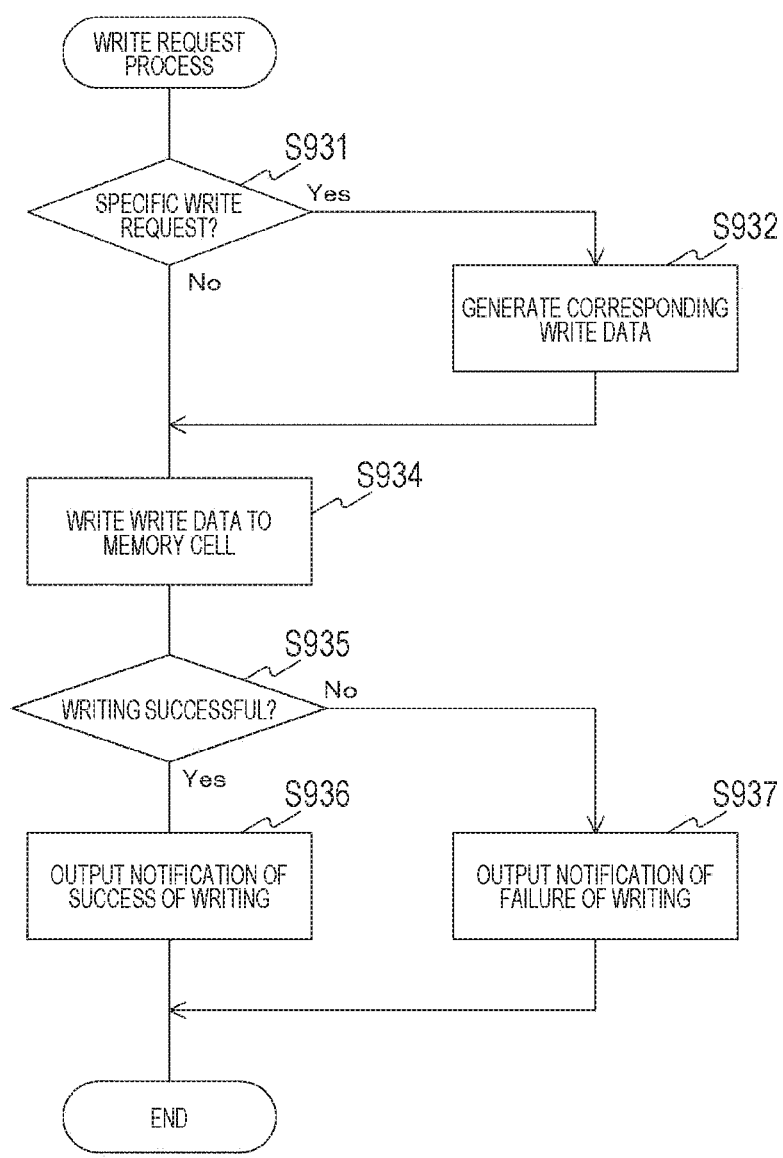
FIG. 8 is a flowchart illustrating an example of a processing procedure of a memory 300 according to the first embodiment of the present technology.

FIG. 8 is a flowchart illustrating an example of a processing procedure of a memory 300 according to the first embodiment of the present technology.

The request interpretation unit 320 discriminates whether or not a write request issued from the memory controller 200 is a specific write request (step S931). If the write request is a specific write request (step S931: Yes), the specific data pattern generating unit 330 generates the specific data pattern corresponding to the specific write request as write data (step S932). Note that, if the write request is a normal write request, the write data received via the data channel 202 is used as it is. Incidentally, the write data includes an ECC.

The memory array 310 writes the write data supplied from the specific data pattern generating unit 330 to a memory cell (step S934). If the writing is succeeded (step S935: Yes), the memory controller 200 is notified of the success of the writing via the response channel 204 (step S936). On the other hand, if the writing fails (step S935: No), the memory controller 200 is notified of the failure of the writing via the response channel 204 (step S937).

Figure 9:
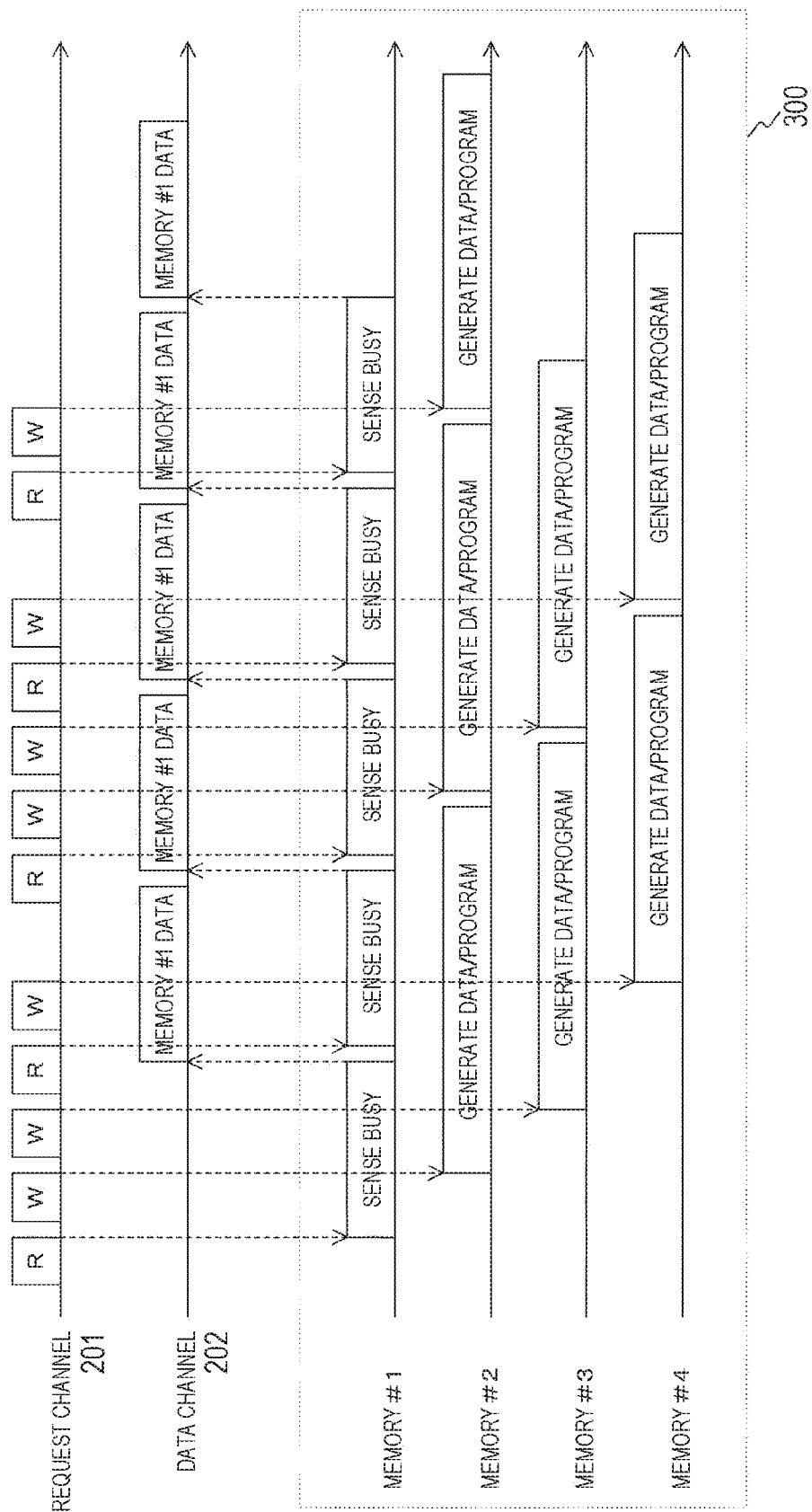
FIG. 9 is a timing chart illustrating an example of access timing to memories 300 according to the embodiment of the present technology.

FIG. 9 is a timing chart illustrating an example of access timing to memories 300 according to the embodiment of the present technology.

In this example, a read request (indicated by "R" in the figure) is frequently issued to the request channel 201, and read data from the memory #1 occupies the data channel 202. In such a situation, issuance of a write request enters a stand-by state in the related art since the data channel 202 is needed to send write data.

Contrarily, according to the embodiment, in a case where a specific data pattern is to be written, a specific write request (indicated by "W" in the figure) can be issued without using the data channel 202. That is, since the specific data pattern is generated as write data in the memories #2 to #4 that have received a specific write request, it is understood that it is possible to keep issuing write requests without using the data channel 202.

As described above, since write data is generated in the memory 300 according to the first embodiment of the present technology, the memory controller 200 can issue write requests without using the data channel 202.

2. Second Embodiment

In the above-described first embodiment, the memories 300 store write data together with ECCs thereof. Meanwhile, depending on a system, there are cases where it is necessary to store management information other than write data in memories 300. In this second embodiment, a configuration will be described in which management information is stored in memories 300 in addition to write data. Note that the overall configuration as an information processing system is similar to that of the above-described first embodiment, and thus detailed description thereof will be omitted.

[Configuration]

Figure 10:
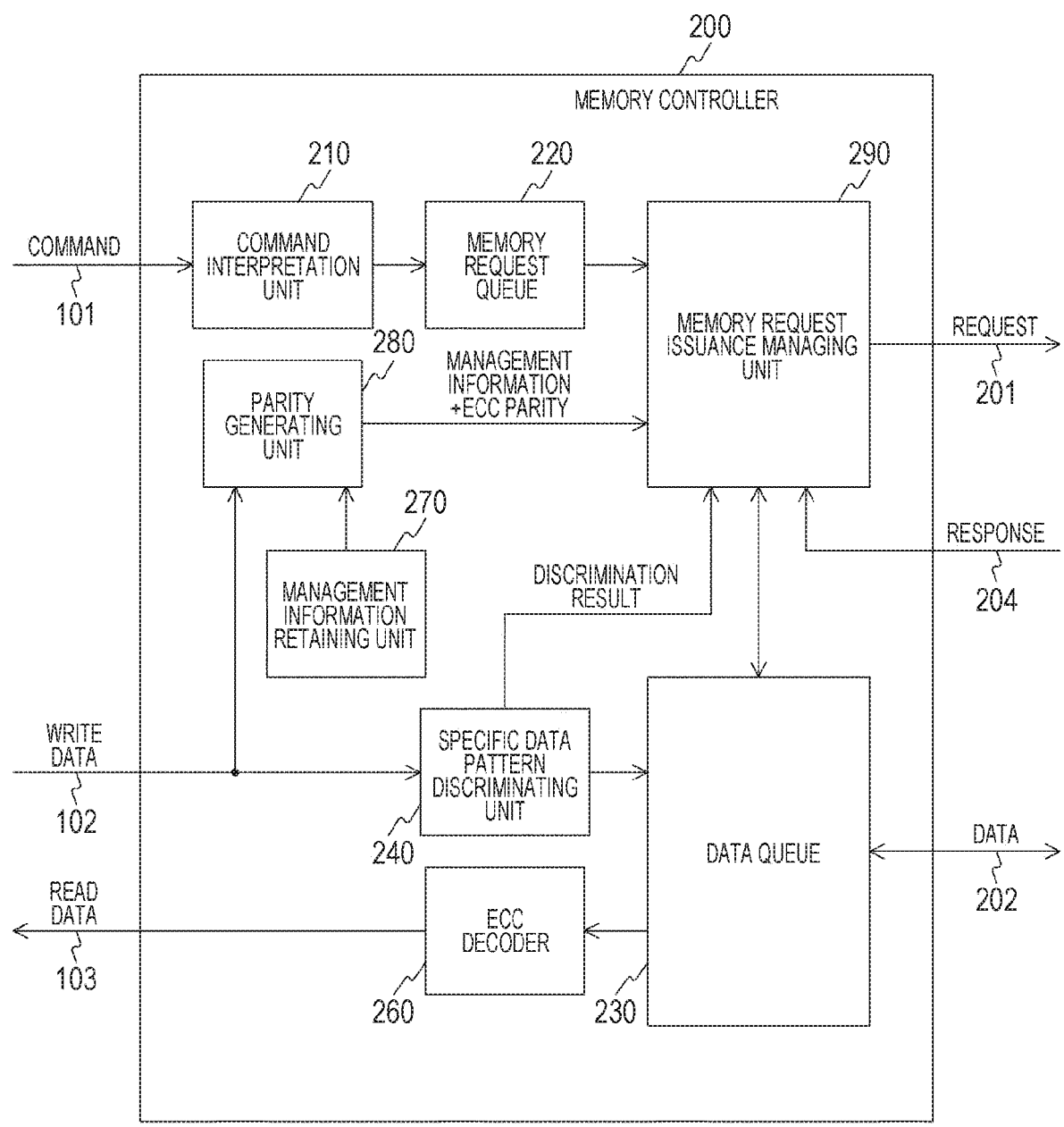
FIG. 10 is a diagram illustrating an exemplary configuration of a memory controller 200 according to a second embodiment of the present technology.

FIG. 10 is a diagram illustrating an exemplary configuration of a memory controller 200 according to the second embodiment of the present technology.

The memory controller 200 in the second embodiment is different from the above-described first embodiment in that a management information retaining unit 270 and a parity generating unit 280 are included instead of the ECC encoder 250.

The management information retaining unit 270 retains management information to be stored in a memory 300. The management information is used for management of the memory system 400, and, for example, a logical address or defective cell information in the memory 300 regarding the write command is assumed.

First, a logical address as the management information will be described. The memory system 400 is accessed from the host computer 100 by a logical address; however, conversion to a physical address is required for internal access to 300. For this purpose, an address conversion table is included. It is assumed that the memory system 400 updates the address conversion table recorded in the memory 300 to the latest contents at predetermined timing. There are cases where the most recent address conversion table is not stored in the memory device or a problem occurs in the read address conversion table before or during the update due to unintended power shutdown or other reasons. Therefore, there is a need to ensure that necessary information can be reestablished. Therefore, as one approach, it is effective to write the logical address information, which corresponds to the physical address to be written, together with the write data when each piece of data is written. This allow the address conversion table to be reestablished by reading all pieces of data in the memory 300 even when a problem occurs in the address conversion table.

Next, defective cell information as the management information will be described. If there is a defective cell in a memory array 310 that cannot normally record, the memory controller 200 needs to grasp this location as defective cell information. In a case where the defective cell information becomes unavailable due to an unintended cause, there is a need to ensure that the defective cell information can be reestablished. Therefore, like in the case of the above-described logical address, by writing a mark indicating that the cell is normal together with the write data, the defective cell information can be reestablished by reading all pieces of data in the memory 300 even in a case where the defective cell information is lost.

Since such management information needs to be written to the memory 300 together with the write data, the management information is supplied to the parity generating unit 280.

The parity generating unit 280 generates ECC parity of the write data and the management information. The parity generating unit 280 supplies the generated ECC parity to the memory request issuance managing unit 290 together with the management information. However, the write data is not supplied to the memory request issuance managing unit 290. This is because the write data is not required to be supplied to the memory 300 in the first place in a case of a specific data pattern, and if not in a case of a specific data pattern, the write data is supplied to the memory 300 via the data channel 202, and thus the memory request issuance managing unit 290 is not passed through. Note that the parity generating unit 280 is an example of the error correction code generating unit described in the claims.

Figure 11:
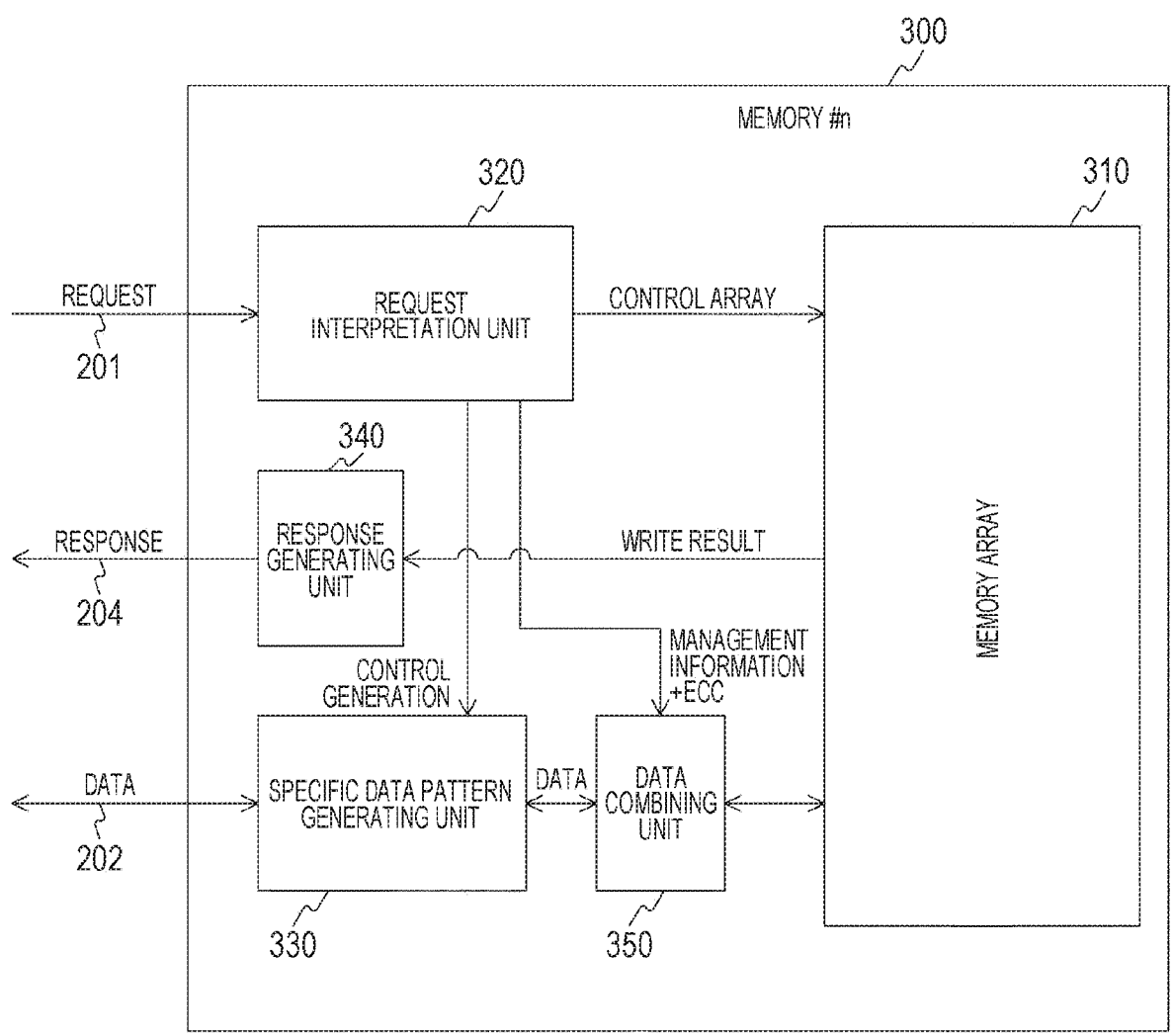
FIG. 11 is a diagram illustrating a configuration example of a memory 300 according to the second embodiment of the present technology.

FIG. 11 is a diagram illustrating a configuration example of a memory 300 according to the second embodiment of the present technology.

The memory 300 according to the second embodiment is different from that of the first embodiment in that a data combining unit 350 is included. The data combining unit 350 combines write data supplied from a specific data pattern generating unit 330 and management information and ECC supplied from a request interpretation unit 320, and writes the combined data to the memory array 310. Unlike in the first embodiment described above, the ECC is supplied via a request channel 201 together with the management information, and thus the data combining unit 350 needs to combine the ECC with the write data.

Figure 12:
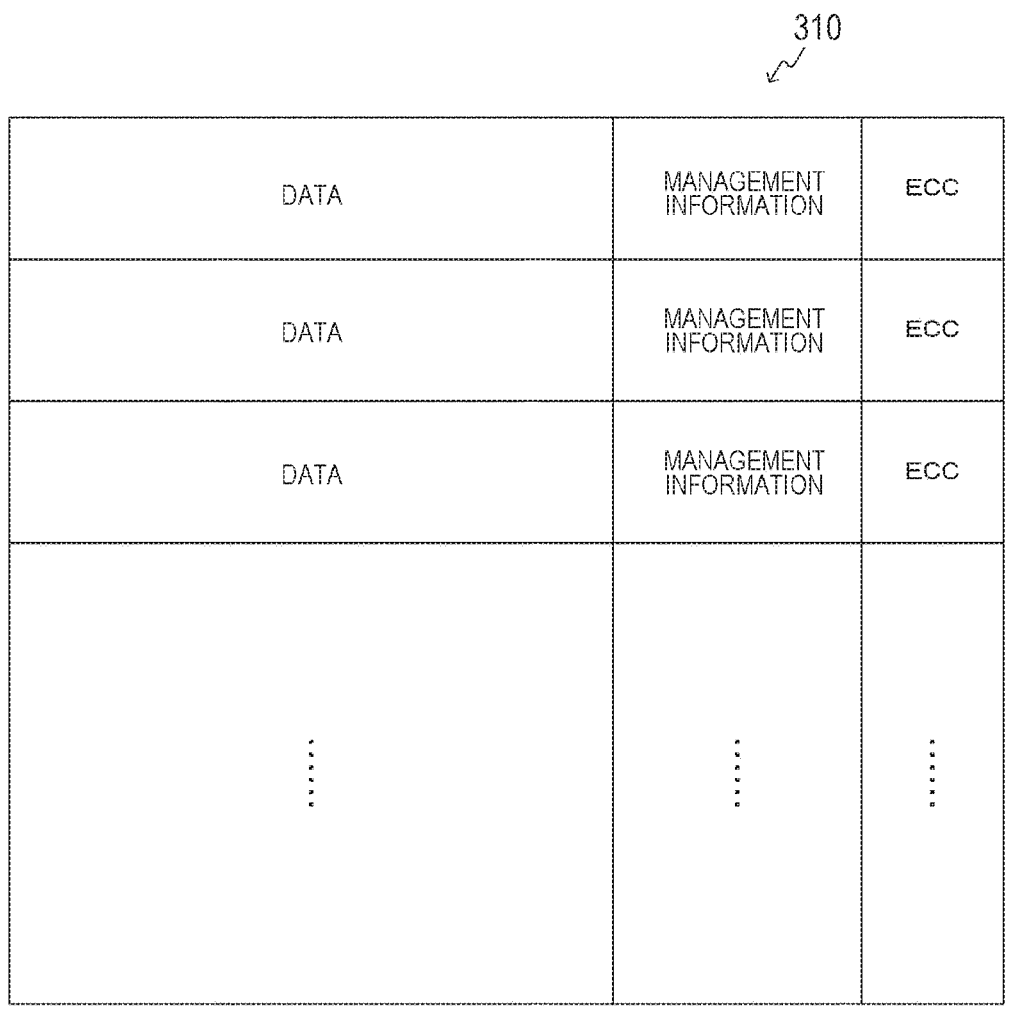
FIG. 12 is a diagram illustrating an example of storage contents of a memory array 310 according to the second embodiment of the present technology.

FIG. 12 is a diagram illustrating an example of storage contents of the memory array 310 according to the second embodiment of the present technology.

The memory array 310 according to the second embodiment stores data, related information, and ECC in association with each other. The ECC is generated by the parity generating unit 280 and written by a write request via the request channel 201. The data, the related information, and the ECC are read in response to a read request, and are subjected to error detection and error correction by an ECC decoder 260. Therefore, the reliability of the memory 300 is ensured.

[Operation]

Figure 13:
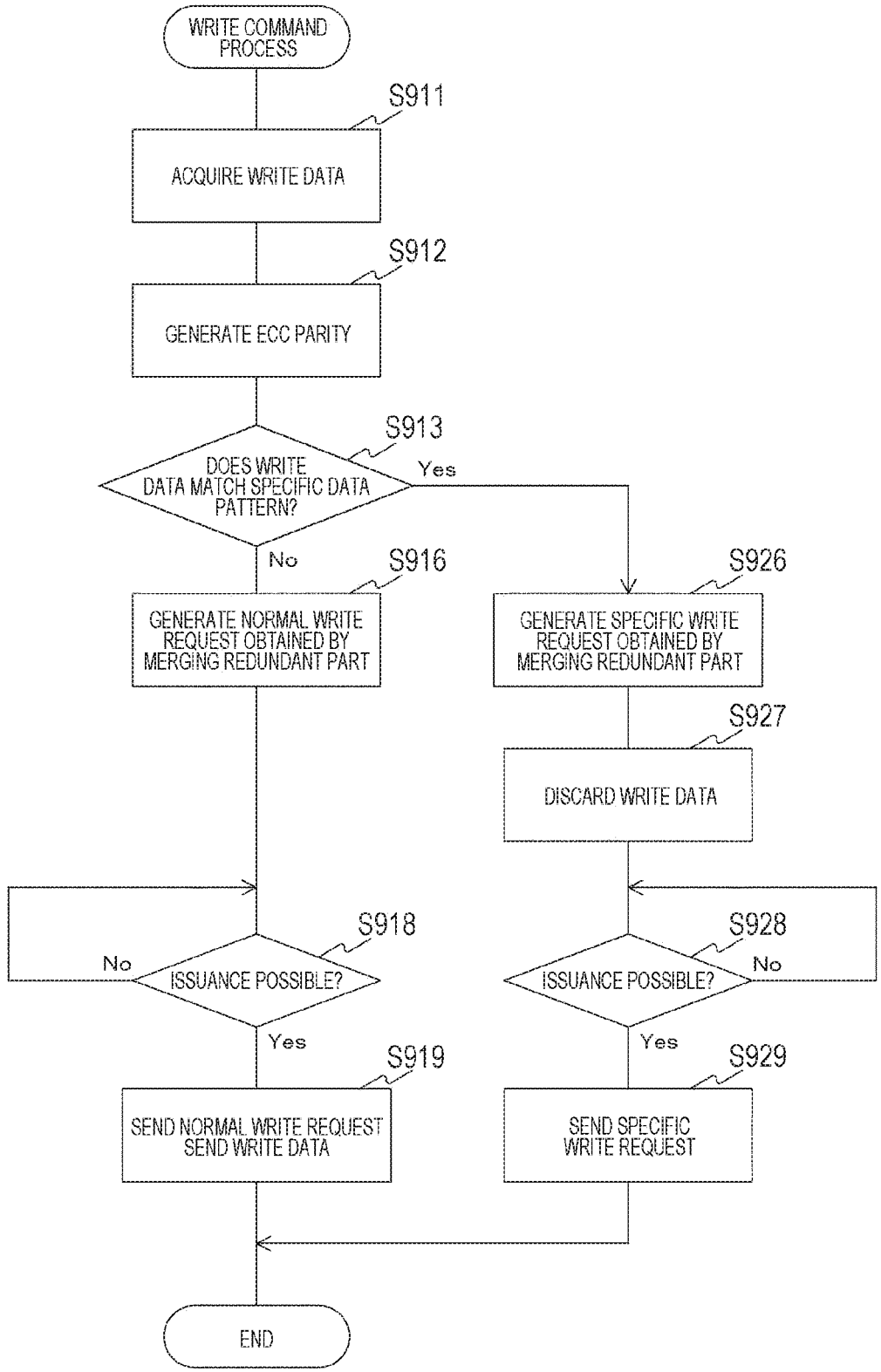
FIG. 13 is a flowchart illustrating an exemplary processing procedure of the memory controller 200 according to the second embodiment of the present technology.

FIG. 13 is a flowchart illustrating an exemplary processing procedure of the memory controller 200 according to the second embodiment of the present technology.

In the memory controller 200 according to the second embodiment, after obtaining write data (step S911), the parity generating unit 280 generates ECC parity of the write data and management information (step S912). Then, the specific data pattern discriminating unit 240 discriminates whether or not the write data matches a specific data pattern retained in the specific data pattern retaining unit 241 (step S913).

If the write data does not match a specific data pattern (step S913: No), the memory request issuance managing unit 290 generates a normal write request in which redundant parts (management information and ECC parity) are combined (step S916). Then, if it becomes possible to issue the request (step S918: Yes), a normal write request is issued to a memory 300 via the request channel 201 (step S919). At this point, the corresponding write data is supplied to the memory 300 via the data channel 202 (step S919).

On the other hand, if the write data matches a specific data pattern (step S913: Yes), the memory request issuance managing unit 290 generates a specific write request in which the redundant parts are combined (step S926). In this case, the specific data pattern discriminating unit 240 discards the write data (step S927). Then, if it becomes possible to issue the request (step S928: Yes), the specific write request is issued to the memory 300 via the request channel 201 (step S929). At this point, the write data is discarded, and the data channel 202 is not used.

Figure 14:
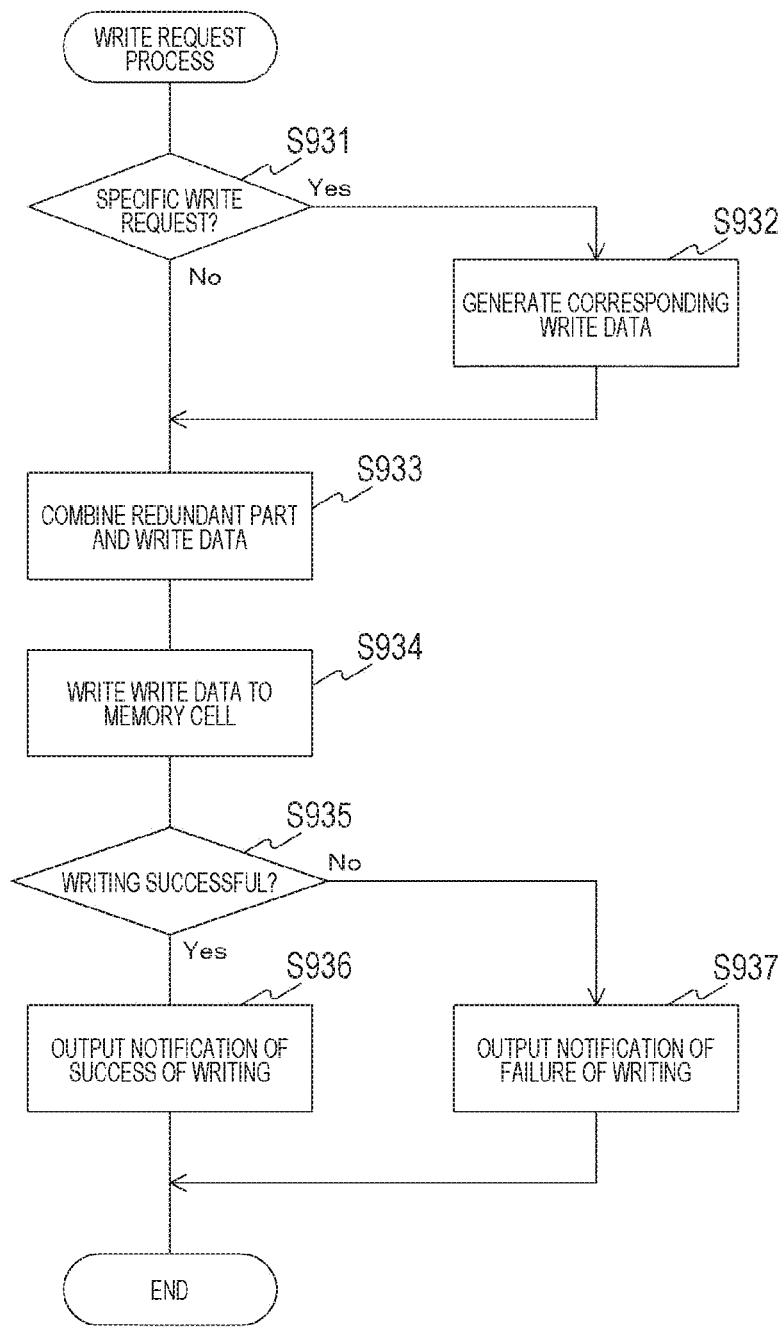
FIG. 14 is a flowchart illustrating an example of a processing procedure of the memory 300 according to the second embodiment of the present technology.

FIG. 14 is a flowchart illustrating an example of a processing procedure of the memory 300 according to the second embodiment of the present technology.

In the memory 300 according to the second embodiment, the request interpretation unit 320 discriminates whether or not the write request issued from the memory controller 200 is a specific write request (step S931). If the write request is a specific write request (step S931: Yes), the specific data pattern generating unit 330 generates the specific data pattern corresponding to the specific write request as write data (step S932). Note that, if the write request is a normal write request, the write data received via the data channel 202 is used as it is.

Then, the redundant parts (management information and ECC parity) are supplied from the request interpretation unit 320, and the data combining unit 350 combines the write data supplied from the specific data pattern generating unit 330 and the redundant parts supplied from the request interpretation unit 320 (step S933).

The memory array 310 writes the write data, the management information, and the ECC supplied from the data combining unit 350 to a memory cell (step S934). If the writing is succeeded (step S935: Yes), the memory controller 200 is notified of the success of the writing via the response channel 204 (step S936). On the other hand, if the writing fails (step S935: No), the memory controller 200 is notified of the failure of the writing via the response channel 204 (step S937).

As described above, according to the second embodiment of the present technology, the management information is supplied via the request channel 201, and thus the memory controller 200 can issue a write request without using the data channel 202.

Note that the embodiments described above illustrate examples for embodying the present technology, and matters of the embodiments and matters specifying the invention in the claims correspond with each other. Likewise, matters specifying the invention in the claims and matters of the embodiments of the present technology denoted by the same name correspond with each other. However, the present technology is not limited to the embodiments, and can be embodied by applying various modifications to the embodiments without departing from the principles thereof.

In addition, the processing procedure described in the above embodiments may be regarded as a method having a series of the procedures, or as a program for causing a computer to execute a series of the procedures or as a recording medium for storing the program. As this recording medium, for example, a compact disc (CD), a mini disc (MD), a digital versatile disc (DVD), a memory card, a Blu-ray (registered trademark) disc, or the like may be used.

Note that the effects described herein are merely examples and thus are not limited. Other effects may also be included.

Note that the present technology may also employ the configurations as follows.

(1) A memory controller including:
a specific data pattern retaining unit that retains a specific data pattern;
a comparator that compares write data regarding a write command from a host computer and the specific data pattern; and
an issuance unit that issues a specific write request that requests writing of the specific data pattern without supplying the write data to a memory in a case where the write data matches the specific data pattern.

(2) The memory controller according to item (1),
in which the specific data pattern retaining unit retains a plurality of the specific data patterns in association with identifiers, and
the issuance unit issues one of the identifiers that is associated with the specific data pattern that matches the write data to the memory together with the specific write request.

(3) The memory controller according to item (1) or (2), further including:
an error correction code generating unit that generates an error correction code regarding the write data; and
an error correction processing unit that performs an error correction process on the basis of an error correction code regarding reading from the memory,
in which the specific data pattern includes the error correction code regarding the write data.

(4) The memory controller according to item (1) or (2), further including:
a management information retaining unit that retains predetermined management information;
an error correction code generating unit that generates an error correction code regarding the write data and the management information; and
an error correction processing unit that performs an error correction process on the basis of an error correction code regarding reading from the memory,
in which the issuance unit issues the error correction code regarding the write data and the management information to the memory together with the specific write request.

(5) The memory controller according to item (4),
in which the management information is a logical address in the memory regarding the write command.

(6) The memory controller according to item (4),
in which the management information is defective cell information in the memory regarding the write command.

(7) A memory including:
a memory array;
a specific data pattern retaining unit that retains a specific data pattern;
a request interpretation unit that interprets a request issued by the memory controller; and
a specific data pattern generating unit that writes the specific data pattern retained in the specific data pattern retaining unit to the memory array when it is interpreted that a specific write request has been issued.

(8) A memory system including:
a memory controller that issues a specific write request that requests writing of a specific data pattern without supplying write data in a case where the write data regarding a write command from a host computer matches the specific data pattern; and
a memory that generates the specific data pattern corresponding to the specific write request and writes the specific data pattern to a memory array when the specific write request is issued from the memory controller.

(9) An information processing system including:
a host computer;
a memory controller that issues a specific write request that requests writing of a specific data pattern without supplying write data in a case where the write data regarding a write command from the host computer matches the specific data pattern; and
a memory that generates the specific data pattern corresponding to the specific write request and writes the specific data pattern to a memory array when the specific write request is issued from the memory controller.

(10) A method of control of a memory controller, the method including:
a comparison procedure of comparing write data regarding a write command from a host computer with a specific data pattern; and
an issuance procedure of issuing a specific write request that requests writing of the specific data pattern without supplying the write data to a memory in a case where the write data matches the specific data pattern.

(11) A method of control of a memory, the method including:
a request interpretation procedure of interpreting a request issued by a memory controller; and
a specific data pattern generating procedure of writing a specific data pattern retained in a specific data pattern retaining unit to a memory array when it is interpreted that a specific write request has been issued.

REFERENCE SIGNS LIST

100 Host computer
101 Command interface
102, 103 Data interface
200 Memory controller
201 Request channel
202 Data channel
204 Response channel
210 Command interpretation unit
220 Memory request queue
230 Data queue
240 Specific data pattern discriminating unit
241 Specific data pattern retaining unit
242 Comparator
243 Selector
250 ECC encoder
260 ECC decoder 270 Management information retaining unit
280 Parity generating unit
290 Memory request issuance managing unit
300 Memory
310 Memory array
320 Request interpretation unit
330 Specific data pattern generating unit
331 Specific data pattern retaining unit
332 Comparator
333 Selector
340 Response generating unit
350 Data combining unit
400 Memory system

The invention claimed is:

1. A memory controller, comprising:
a specific data pattern discriminating unit that includes:
  a specific data pattern retaining unit configured to retain a specific data pattern; and
  a comparator configured to compare write data and the specific data pattern, wherein
    the write data is associated with a write command from a host computer, and
    the write command corresponds to a request to access a memory cell area of a memory; and
an issuance unit configured to:
  determine completion of a read operation of specific data from the memory cell area;
  issue a specific write request to the memory based on
    the determination of the completion of the read operation of the specific data from the memory cell area, and
    a result of the comparison that indicates the write data matches the specific data pattern; and
  receive a response based on a write result in the memory, wherein
    the specific write request is a request to write the specific data pattern to the memory,
    the specific data pattern discriminating unit is configured to discard the write data based on the result of the comparison that indicates the write data matches the specific data pattern, and
    the write result indicates one of success of a write operation of the write data to the memory or failure of the write operation of the write data to the memory.

2. The memory controller according to claim 1, wherein
the specific data pattern retaining unit is further configured to retain a plurality of specific data patterns in association with a plurality of identifiers,
the plurality of specific data patterns includes the specific data pattern,
the issuance unit is further configured to issue the specific write request together with an identifier of the plurality of identifiers to the memory, and
the identifier is associated with the specific data pattern that matches the write data.

3. The memory controller according to claim 1, further comprising:
an error correction code generating unit configured to generate an error correction code regarding the write data; and
an error correction processing unit configured to perform an error correction process based on an error correction code regarding the specific data read from the memory, wherein the specific data pattern includes the error correction code regarding the write data.

4. The memory controller according to claim 1, further comprising:
a management information retaining unit configured to retain management information;
an error correction code generating unit configured to generate an error correction code regarding the write data and the management information; and
an error correction processing unit configured to perform an error correction process based on an error correction code regarding the specific data read from the memory, wherein the issuance unit is further configured to issue the specific write request together with the error correction code regarding the write data and the management information to the memory.

5. The memory controller according to claim 4, wherein the management information includes a logical address in the memory regarding the write command.

6. The memory controller according to claim 4, wherein the management information includes defective cell information in the memory regarding the write command.

7. A memory, comprising:
a memory array;
a specific data pattern retaining unit configured to retain a specific data pattern;
a request interpretation unit configured to:
  receive, from a memory controller, a read request for a read operation of specific data from a memory cell area of the memory array;
  determine a request issued by the memory controller is a specific write request, wherein
    the memory controller:
      compares write data and the specific data pattern, and
      determines completion of the read operation of the specific data from the memory cell area, and
    the request issued by the memory controller is based on
      the determination of the completion of the read operation of the specific data from the memory cell area, and
      a result of the comparison that indicates the write data matches the specific data pattern;
a specific data pattern generating unit configured to write, based on the determination that the request issued by the memory controller is the specific write request, the specific data pattern retained in the specific data pattern retaining unit to the memory array; and
a response generating unit configured to output a response based on a write result in the memory, wherein the write result indicates one of success of a write operation of the write data to the memory or failure of the write operation of the write data to the memory.

8. A memory system, comprising:
a memory that comprises a memory array; and
a memory controller configured to:
  receive write data from a host computer, wherein
    the write data is associated with a write command from the host computer, and
    the write command corresponds to a request to access a memory cell area of the memory array;
  determine the write data matches a specific data pattern;
  determine completion of a read operation of specific data from the memory cell area;

issue a specific write request to the memory based on
the determination of the completion of the read
operation of the specific data from the memory
cell area, and
the determination that the write data matches the
specific data pattern, wherein the specific write
request is a request to write the specific data
pattern to the memory array;
discard the write data based on the determination that
the write data matches the specific data pattern,
wherein the memory is configured to:
generate the specific data pattern corresponding to
the specific write request; and
write the generated specific data pattern to the
memory array; and
receive a response based on a write result in the
memory, wherein the write result indicates one of
success of a write operation of the write data to the
memory or failure of the write operation of the write
data to the memory.

9. An information processing system, comprising:
a memory that comprises a memory array;
a host computer configured to issue a write command
associated with write data,
wherein the write command corresponds to a request to
access a memory cell area of the memory; and
a memory controller configured to:
receive the write data;
determine the write data matches a specific data pattern;
determine completion of a read operation of specific
data from the memory cell area;
issue a specific write request to the memory based on
the determination of the completion of the read
operation of the specific data from the memory
cell area, and
the determination that the write data matches the
specific data pattern, wherein the specific write
request is a request to write the specific data
pattern to the memory array;
discard the write data based on the determination that
the write data matches the specific data pattern,
wherein the memory is configured to:
generate the specific data pattern corresponding to
the specific write request; and
write the generated specific data pattern to the
memory array; and
receive a response based on a write result in the
memory, wherein the write result indicates one of
success of a write operation of the write data to the
memory or failure of the write operation of the write
data to the memory.

10. A method of control of a memory controller, the
method comprising:
receiving write data from a host computer, wherein
the write data is associated with a write command from
the host computer, and
the write command corresponds to a request to access
a memory cell area of a memory;
comparing the write data with a specific data pattern;
determining completion of a read operation of specific
data from the memory cell area;
issuing a specific write request to the memory based on
the determination of the completion of the read operation of the specific data from the memory cell area,
and
a result of the comparison that indicates the write data
matches the specific data pattern, wherein the specific write request is a request for writing the specific
data pattern to the memory;
discarding the write data based on the result of the
comparison that indicates the write data matches the
specific data pattern; and
receiving a response based on a write result in the
memory, wherein the write result indicates one of
success of writing the write data to the memory or
failure of the writing the write data to the memory.

11. A method of control of a memory, the method comprising:
retaining a specific data pattern in a specific data pattern
retaining unit of the memory;
receiving, from a memory controller, a read request for a
read operation of specific data from a memory cell area
of the memory;
determining a request issued by the memory controller is
a specific write request, wherein
the memory controller:
compares write data and the specific data pattern,
and
determines completion of the read operation of the
specific data from the memory cell area, and
the request issued by the memory controller is based on
the determination of the completion of the read
operation of the specific data from the memory
cell area, and
a result of the comparison that indicates the write
data matches the specific data pattern;
writing, based on the determination that the request issued
by the memory controller is the specific write request,
the specific data pattern retained in the specific data
pattern retaining unit to a memory array of the memory;
and
outputting a response based on a write result in the
memory, wherein the write result indicates one of
success of writing the write data to the memory or
failure of the writing the write data to the memory.

* * * * *